United States Patent
Ishibashi et al.

(10) Patent No.: US 7,498,070 B2
(45) Date of Patent: Mar. 3, 2009

(54) OPTICAL INFORMATION RECORDING MEDIUM

(75) Inventors: Sachiko Ishibashi, Kanagawa (JP); Fumi Hara, Gunma (JP); Toru Fujii, Gunma (JP); Yuji Arai, Gunma (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 576 days.

(21) Appl. No.: 11/225,335

(22) Filed: Sep. 13, 2005

(65) Prior Publication Data

US 2006/0077868 A1 Apr. 13, 2006

(30) Foreign Application Priority Data

Sep. 14, 2004 (JP) ............... 2004-266863

(51) Int. Cl.
  *B32B 3/02* (2006.01)
(52) U.S. Cl. .............. 428/64.1; 428/64.4; 428/65.2; 430/270.11
(58) Field of Classification Search .............. 428/64.4, 428/64.8; 430/270.14, 270.18, 270.2
See application file for complete search history.

(56) References Cited

U.S. PATENT DOCUMENTS

| | | | |
|---|---|---|---|
| 6,440,519 B1 * | 8/2002 | Takase et al. ............... | 428/65.2 |
| 7,005,174 B2 * | 2/2006 | Yamasaki et al. ........... | 428/64.1 |
| 7,245,580 B2 * | 7/2007 | Yamada et al. ............. | 369/275.5 |
| 2005/0118417 A1 * | 6/2005 | Min et al. .................... | 428/364 |
| 2005/0265217 A1 * | 12/2005 | Ootera ........................ | 369/283 |

FOREIGN PATENT DOCUMENTS

| | | | |
|---|---|---|---|
| JP | 03295039 | * | 12/1991 |
| JP | 9-69239 | | 11/1997 |
| JP | 2002-241711 | * | 8/2002 |
| JP | 2003-272232 | | 9/2003 |

* cited by examiner

*Primary Examiner*—Elizabeth Mulvaney
(74) *Attorney, Agent, or Firm*—Knobbe Martens Olson & Bear LLP

(57) ABSTRACT

For improving the humidity resistance reliability and the jitter property of an optical disk, the adhesive layer used for bonding a bonding type optical information recording medium is defined such that the glass transition temperature is 100° C. or higher at 200° C. or lower, the modulus of elasticity at 25 to 80° C. is 1000 MPa or more, the adhesion strength thereof is 4 N or more, the reflective layer is defined such that the hardness is 60 mgf/$\mu m^2$ or more as the nano indentation hardness, and the dye recording layer is defined such that the water solubility of the dye as light absorption is 0.2 or less.

6 Claims, No Drawings

OPTICAL INFORMATION RECORDING MEDIUM

BACKGROUND OF THE INVENTION

1. Field of the Invention

The present invention concerns a write-once type optical information recording medium having excellent recording characteristics.

2. Description of Related Art

Write-once type optical information recording media, such as bonded optical disks have been well known including, those formed by opposing, for example, an optical disk having, on a transparent substrate, a layered structure containing a dye recording layer, a reflective layer and, optionally, a protective layer or the like and another optical disk of an identical layered structure or a different layered structure at least containing the dye recording layer, and bonding them to each other by way of an adhesive, with the layered structures thereof being opposed to each other, or opposing a pair of transparent substrates per se and bonding to each other by way of an adhesive, in which information can be recorded or reproduced by applying a light of a semiconductor laser at a waveform of from 300 to 670 nm for DVD or applying a light of a semiconductor laser at a longer layer wavelength for CD-R on the side of the other main surface as described in JP-A No. 9-69239.

SUMMARY OF THE INVENTION

Since the adhesive layer described in this patent publication uses a material mainly comprising a cation polymerization system resin, the glass transition temperature (Tg) is excessively low and peeling may sometimes occur between both of substrates. In addition, in a case where Tg is excessively low, the initial jitter value is worsened as the optical disk or so-called humidity resistance reliability tend to be worsened in which the adhesive layer absorbs moisture in air and is denatures to lower the strength, and optical Fcharacteristics or mechanical characteristics as the optical information recording medium can not be satisfied.

Heretofore, less discussion has been made so far on the peeling between both of the substrates of optical disks having the bonded structure, not only in view of the strength of the adhesive layer but also in relations with other constituent portions while taking on the physical property values thereof respectively.

The present invention intends, at first, to provide an optical information recording medium capable of coping with the increasing recording speed and not suffering from degradation for the initial jitter and the humidity resistance reliability.

The invention intends, secondly, to provide an optical information recording medium having a bonded structure free from peeling even upon taking out of a containment case.

In order to attain the foregoing subjects, the present invention provides, in a first aspect, an optical information recording medium in which a pair of transparent substrates are opposed, at least one of the main surfaces thereof opposing each other has layers each of which includes a recording layer which is to be recorded or has been recorded, opposed surfaces are bonded by way of an adhesive layer, and at least a reproducing light of a recording light or the reproducing light can be entered on the other main surfaces of the respective transparent substrates, wherein the adhesive layer has such a temperature property for the modulus of elasticity that the glass transition temperature is 100° C. or higher and 200° C. or lower in view of the change of the modulus of elasticity relative to the temperature.

In a preferred embodiment of the invention, the modulus of elasticity of the adhesive layer at 25 to 80° C. is 1000 MPa or more.

In a further embodiment, the adhesive layer has such an adhesion strength property that a load value just before peeling of the pair of transparent substrates from each other is 4 N or more, in a case where the paired substrates are formed each into a disk (120 mm diameter, 0.6 mm thickness) each of the layer being formed thereon and are opposed and bonded to each other by way of the adhesive layer, a rigid thin film metal piece is inserted in a gap between both of the pair of transparent substrates at the inner circumference thereof, and a load is applied only to the lower portion while fixing the upper portion.

In a further embodiment of the invention, each of the layers includes a reflective layer, and the reflection layer has a hardness property of 60 mgf/μm$^2$ or more as a nano indentation hardness.

In a further embodiment, the dye recording layer has such a dissolving property of the dye to water that absorption of hot water at a maximum absorption wavelength is 0.2 or less when the dye of the dye recording layer coated on a polycarbonate substrate of 2.5 cm square is dipped in 5 ml of hot water at 75° C. for 60 min.

According to the invention, it is possible to provide an optical information recording medium capable of coping with the increasing recording speed and not suffering from degradation for the initial jitter and the humidity resistance reliability and provide an optical information recording medium having a bonded structure free from peeling even upon taking out of a containment case.

DESCRIPTION OF PREFERRED EMBODIMENT

In the present invention, the optical information recording medium includes any of bonded type optical disks using only the optical laser light for recording and reproduction and using an opto-magnetic recording/reproducing system.

For example, the optical information recording medium includes, specifically, bonded type optical disks, formed by opposing an optical disk in which a dye recording layer, a metal reflective layer formed thereon, and a protective layer formed optionally further thereon are disposed on one main surface of a transparent substrate and a peelable protective layer is disposed optionally on the other main surface and another optical disk in which the dye recording layer; the reflective layer and the optional protective layer (for example, of UV-curable resin) and a protective film are disposed in the same manner, or an optical disk in which a portion of the dye recording layer, the reflective layer and the protective layer is not disposed and other layers are disposed in the same manner, with the side of the main surface provided with each of the layers being opposed each other; or opposing any one of the optical disks described above and another optical disk configured in the same manner as described above except for previously forming tracking guide grooves in the transparent substrate and disposing a dye recording layer thereon, with the sides of the main surfaces provided with respective dye recording layers being opposed each other; or opposing any one of the optical disks described above and another transparent substrate, and bonding them by way of an adhesive layer, respectively. For recording or reproducing information to and from them, a recording light or a reproducing light is entered on the side from which the protection film is peeled or directly on the side in a case where the protective film is not disposed. Generally, in a case of using a laser light as a reproducing light or recording light, a semiconductor laser light at a wavelength of 400 to 670 nm is used for DVD±R or at a wavelength of 770 to 830 nm is used for CD-R, but other laser lights may also be used.

While the recording layer has the dye recording layer in the case described above, a read only optical disk such as CD is also available, in which the dye recording layer is not present, recording is conducted to the transparent substrate per se, and a reflective layer and a protective layer are successively stacked thereover. In this optical disk, a reproducing light is incident to the transparent substrate on the side opposite to the recorded site and information can be reproduced by row recording pits formed on the transparent substrate and a reflective layer covering them. Also this optical disk can be used in the same manner as described above as one of optical disks in the bonded type optical disk.

In addition to the dye recording layer and the reflective layer, other layers, for example, a layer for improving the bondability between the layers described above and other adjacent layers, an oxygen impermeable layer comprising, for example, $SiO_2$ for improving the reliability in addition to information recording and, further, an antioxidation layer for preventing oxidation of the optical reflective layer may be interposed between the optical reflective layer and the protective layer.

The protective layer disposed over the reflective layer is a layer for protecting an information recorded portion against external physical or mechanical disorders and the thickness is, preferably, within a range from 5 to 10 μm. Particularly, a protective layer comprising a UV-ray curable resin that can avoid undesired effects caused by heating to the substrate or the recording layer and can be formed in a short time upon forming the protective layer is particularly preferred.

The adhesive layer for the bonding preferably has to satisfy at least the following property (a) and, more preferably, the following property (b) after drying or after curing. (a) Temperature property of the modulus of elasticity that the glass transition temperature is 100° C. or higher and 200° C. or lower in view of the change of the modulus of elasticity relative to the temperature. (b) Modulus property that the modulus of elasticity is at least 1000 MPa at 25 to 80° C.

The upper limit for (b) is defined as 5000 MPa. At a higher value, problems may possibly occur for the peeling between both of the substrates failing to obtain a desired adhesive strength, that is, the adhesion strength (c) may possibly be less than 4N. Further, in a case where it is lower than 1000 MPa, the humidity resistance reliability and the initial jitter are worsened. In view of the above, it is more preferably at least 1400 MPa or more, by which reliable humidity resistance reliability is provided and the initial jitter is improved.

The modulus of elasticity relative to the temperature (stress per unit elongation) shows a large rate of change in the course of transition from a glassy state to a rubbery state and can be distinguished from the glassy state or rubbery state showing small rate of change by the large rate of change. A glass transition temperature exists within a temperature range corresponding to the curve of change in a range showing large rate of change, which is indicated by Tg.

With a view point of the dynamic viscoelasticity, while the dynamic storage modulus (G') representing the magnitude of the elastic factor of a polymer lowers along with increase of the temperature. While G' for a thermoplastic resin lowers continuously also in a rubbery region, (G') for a crosslinked type polymer does not lower continuously in the rubber region but it remains flat or increases. On the other hand, a relation between the dynamic loss modulus (G") representing the magnitude of the viscosity factor of a polymer and the temperature is indicated by a curve having a maximal point. Further, a dynamic loss (loss tangent) tan δ (δ is a phase difference between the stress and the strain vector) can be measured based on the phase difference between the stress and the simple harmonic oscillation of strains, which is a scale representing the extent for the loss of the dynamic energy given to the system due to the heat generation. The temperature showing peak value for tan δ in curve G' is Tg (glass transition temperature) in dynamic measurement, which may be considered as a glass transition temperature Tg. The Tg can be made higher by increasing the crosslinking density or designing a polymer of higher nuclear structural density such as a phenyl nuclei. The Tg can be lowered by lowering the crosslinking density or by introducing, for example, an alkyl chain of a fatty acid to the polymer, or mixing of a plasticizer. For the details, "Modern dye Dispersion Technique" (p 53 to 54, para. 2.1, published in 1993 from Technical Information Society) can be referred to.

(b) is preferably the following (b)'.

(b)' Modulus of elasticity can be 2500 MPa or more (particularly, 3000 MPa or more) and 5000 MPa or less at 25° C., and 1000 MPa or more (particularly, 2000 MPa or more) and 5000 MPa or less at 80° C. In a case where it is lower than the lower limit, problems may occur on the humidity resistance reliability or the jitter. On the other hand, when it is higher than 5000 MPa, it may result in a problem that the adhesion strength is insufficient.

In this case, since the modulus of elasticity is optimized at 25° C. and 80° C. respectively, a reliable humidity resistance reliability can be provided due to the synergistic effect of the optimization and the initial jitter can also be improved. Particularly, also in a case where the dye is highly water soluble, the effect can be provided reliably and can cope also with the increasing recording speed suitably.

In view of the properties (a) and (b) above, curing products of UV-ray curable resin composition used so far as the adhesives for the bonding do not show so high Tg as 100° C. and so large modulus of elasticity as 1000 MPa or more at 25 to 80° C., and the modulus of elasticity at each temperature (b)' is not so large as in the respective values described above. On the other hand, since the adhesive layer according to the invention can selectively use the adhesives having the properties of (a) and (b) (particularly, (b)'), it less suffers from the effect of the humidity and can be suppressed from deformation, the initial jitter and the humidity resistance reliability in the optical disk can be free of deterioration.

The adhesive layer more preferably has the following properties (c) and (d) in addition to the properties (a) and (b).

(c) Adhesion strength property of the adhesive layer that the load value just before peeling of the pair of transparent substrates from each other is 4N or more, in a case where the paired substrates formed each into a disk of 120 mm diameter and 0.6 mm thickness with each of the layers formed thereon opposing each other are bonded by way of an adhesive layer, a thin film metal piece is inserted in a gap between the pair of transparent substrates at the inner circumference of 15 mm diameter, and a load is applied only to the lower portion while fixing the upper portion.

(d) Hardness property that each of the layers has a reflective layer, and the reflective layer has a hardness of 60 mgf/μm² or more as a nano indentation hardness.

The adhesive strength (c) is 4N or more and, particularly preferably, 7N or more. In a case where it is less than 4N, the adhesion strength is insufficient and peeling may sometimes occur between both of the substrates even by merely taking the bonded optical disk out of the containment case. Further, also the hardness of the reflective layer is, particularly preferably, 130 mgf/$\mu m^2$ or more.

In a case where the adhesion strength is less than 4N or the hardness of the reflective layer is less than 60 mgf/$\mu m^2$, the reliability (suppression of worsening of the recording characteristics caused by the dissolving property of dye) can not be improved.

Further, it is also preferred to have the property (e) described below.

(e) The dissolvability of the dye is such that after a 2.5 cm polycarbonate square substrate coated with the dye is soaked in 5 ml of water at 75° C. for 60 min, its optical absorption changes by 0.2 or less at the maximum absorption wavelength.

(e) shows the dissolving property of the dye to water and in a case where the absorption is 0.2 or less, preferably, 0.15 or less and, more preferably, 0.1 or less, a uniform and high density continuous thin film can be formed easily when the solution is coated to form a dye recording layer, and highly fine recording is possible to the dye recording layer, which is suitable also to high speed recording. As described above, among (a) to (e), a plurality of characteristics including (a) may be satisfied. By satisfying most of them, particularly, satisfying all of them, the initial jitter or the humidity resistance reliability for the optical disk can further be improved due to the synergistic effect of optimizing the glass transition temperature, the modulus of elasticity, the hardness of the reflective layer and the water solubility of the dye.

The adhesive capable of having the properties (a) to (c) described above may either be a non-curable or curable type. The curable type may be a thermosetting type (also including normal temperature setting type) and also includes UV-ray curable resin compositions. (Meth)acrylic resin composition may be mentioned for each of them. The UV-ray curable resin compositions comprise, for example, light sensitive prepolymers (for example, those in which double bonds are introduced in a polymer such as polyester resin), photo-polymerization initiators, reactive diluents (for example, unsaturated monomer such as polyfunctional acrylate monomer) (thermosetting type adhesive may be obtained by using a heat polymerization catalyst instead of the photo-polymerization initiator) and include, for example, SD-694 (manufactured by Dai-Nippon Ink Chemical Industry Co.). The glass transition temperature of the curing product and the modulus of elasticity at each of the temperatures of the composition can be controlled by introducing aromatic rings to the light sensitive prepolymer, increasing the density of double bonds, or selecting the type and the amount of use of the reactive diluent, or the adhesion to the substrate can be improved by introducing functional groups to the light sensitive prepolymers or selecting the kind and the amount of use of the reactive diluents to provide the properties (c) to (e) described above. The adhesive layer is formed by coating an adhesive to one of the optical disks on the side formed with each of the layers by a spin coat method or the like and stacking the other of the optical disks on the side formed with each of the layers or the substrate and by irradiating UV-rays from the opposite side for curing.

The reflective layer includes films of high reflectance material such as a metal film comprising an alloy of each of Au, Al, Ag, Cu, Pt and the like and, further, an alloy with addition of other micro ingredients than described above formed by vapor deposition, sputtering or the like. The reflective layer capable of having the property (d) above can be obtained, for example, as alloy composition and includes one or plurality of alloys comprising Ag and elements selected from the group consisting of Pd, In, Cu, Bi, Ca, Nd, Ni, and Zn, for example, AgPdIn, AgZnCu, AgBi, AgCuPd. AgPd, AgCuCa, AgNdCu, AgCuNi, AgZn, and AgCuBi.

As the dye capable of having the property (e), trimethine cyanine, etc. can be used preferably and specific products include NK-5134, NK-5907, NK-4741, and NK-4413.

In the invention, for the transparent substrate, a resin of a material having a high transparency with a refractive index to a laser light in a range from 1.4 to 1.6 and excellent in the impact resistance is used. Specifically, it is formed by injection molding or other means using a resin such as a polycarbonate, polyolefin, and acryl resin. In this case, tracking guide means of spiral or other shape of guide grooves may be formed. Such tracking guide means can be formed usually by a known method using a stamper.

Further, the protective film includes, for example, films of polyester, nylon, acetate, or polyolefin such as polyethylene. The film preferably has a thickness, for example, of about 100 $\mu m$. Various other materials such as epoxy materials and acrylic materials may also be considered and acrylic materials are preferred among them.

EXAMPLE

The present invention is to be described by way of examples.

Example 1

Two polycarbonate substrates each of 120 mm$\phi$ outer diameter, 15 mm$\phi$ inner diameter, and 12 mm thickness in which guide grooves of 0.8 $\mu m$ width, 0.08 $\mu M$ depth, and 1.6 $\mu m$ of track pitch were formed in a diametrical range from 46 to 117 mm for conducting spiral tracking guide by a stamper (Yubiron: manufactured by Mitsubishi Gas Chemical Co.) were provided. The hardness of the substrate was a pencil hardness HB (using Mitsubishi Pencil) and a heat expansion coefficient thereof was 6×10.5/° C. at 20 to 120° C.

0.65 g of a dye(NK-4624, manufactured by Nippon Kanko Shikiso Kenkyusho) was dissolved in 10 ml of diacetone alcohol, which was spin coated to the polycarbonate substrate on the side formed with the guide grooves while properly changing the number of rotation such that the average film thickness was within a range from 70 to 80 nm and dried to form a dye recording layer.

For the dye, when the light absorption (e) described above showing the dissolving property of the dye was previously measured, it was 0.1. In the measurement, the dye solution described above was coated on a polycarbonate substrate of 2.5 cm square (1 mm thickness) by a spin coat method to form a dye recording layer of 100 mm thickness, which was used as a test specimen. Hot water at 75° C. was poured by 5 mL to 50 cc beaker and the test specimen was dipped while keeping at that temperature and for 60 min. Then, the test specimen was removed, the colored hot water was cooled to a normal temperature and the absorption was measured by a spectrophotometer (manufactured by Hitachi Ltd.)

A reflective layer of 100 nm thickness comprising an alloy film of AgCuZn was formed on the dye recording layer. When the nano indentation hardness (d) was measured for the reflective layer, it was 130 mfg/$\mu m^2$. The hardness was measured by a micro-miniature indentation hardness tester (manufactured by Erionix Co.).

Then, unnecessary portions for the dye recording layer and the reflective layer were removed and a dual layer of the dye recording layer and the reflective layer was formed concentrically within a diametrical range of from 42 to 118 mmφ.

The thus obtained optical disks were manufactured by two and an adhesive comprising a (meth)acrylic UV-curable resin composition (SD-694, manufactured by Dai-Nippon Ink Chemical Co.) was coated to one of the optical disks on the side formed with each of layers such as a dye recording layer, and the other optical disk was opposed and stacked on the side formed with each of the layers such as the dye recording layer, UV-rays were irradiated by a high pressure mercury lamp at 230 mj/cm$^2$ to cure the adhesive and form an adhesive layer of 40 μm thickness. Thus, the bonded optical disk was obtained.

When the characteristics (c) described above were examined for the bonded optical disk, the adhesion strength (peeling strength) was 7N and the optical disk was peeled as it was. In the measurement, after inserting a rigid iron piece of 0.1 mm thickness into a gap at the inner circumference between both of the substrates and gripping and fixing the upper substrate at the periphery thereof, load was applied to the iron piece (each by 10 g), and the load just before the separation of the both substrates was read.

Further, the same adhesive layer as described above was prepared by using SD-694 and irradiating UV-rays in the same manner as described above to obtain test specimens, and the physical property values (a) and (b) described above were determined by measuring the temperature dispersion behavior of the module of elasticity by a dynamic viscoelastic method. A specific measurement was conducted in accordance with JIS-K6251. The results are shown in Table 1.

For the bonded optical disk prior to the test described above, EMF signals were recorded at a line speed of 1.2 m/sec by using an optical disk evaluation device manufactured by Pulse Tech Industry Co. (DDU-1000) mounting a semiconductor laser (NA (number of aperture)=0.45). After recording, when signals were reproduced to measure the reflectance, the modulation degree, and the PI error, all of them were satisfactory and when the jitter was measured, it was 7.7%. Table 1 shows the measured jitter values.

Further, as a result of conducting a humidity resistance reliability test (jitter was measured after keeping the disk in a thermostable bath at 80° C., 80% RH for 400 hours and evaluated such that those recognized for no jitter change were indicated as favorable (O) and those recognized for distinct change as failure (x) before and after the start of the test), they were satisfactory. The evaluation criterion for failure (x) was 13% or more for the jitter and 280 or more for the PI error.

Example 2, Comparative Examples 1 to 3

Bonded optical disks were manufactured in the same manner as in Example 1 except for changing the physical property of the adhesive to the values described in the corresponding columns in Table 1. Table 1 shows the result of measurement in the same manner as in Example 1. In Example 2 and Comparative Examples 1 to 3, the hardness of the reflective layer was 130 mgf/μm$^2$ and the absorption was 0.1 for the water solubility of the dye.

TABLE 1

|  | Example | | Comparative Example | | |
|---|---|---|---|---|---|
|  | 1 | 2 | 1 | 2 | 3 |
| Glass transition temperature (Tg) (° C.) | 180 | 195 | 100 | 80 | 150 |
| Modulus of elasticity (MPa) | | | | | |
| 25° C. | 3200 | 3500 | 1300 | 1500 | 2000 |
| 80° C. | 2100 | 2000 | 460 | 1000 | 800 |
| Humidity resistance reliability test | o | o | x | x | x |
| Initial jitter (%) | 7.7 | 7.3 | 8.35 | 8.7 | 8.17 |
| Adhesion strength (N) (peeling strength) | 7 | 11.1 | 9.1 | 12.7 | 9.5 |

What is claimed is:

1. An optical information recording medium comprising:
    first and second opposing transparent substrates comprising at least one recording layer on a first main surface of the first or second substrate, the recording layer having previously recorded or being configured to record, and the substrates being configured to transmit light from a second main surface to the recording layer; and
    at least one adhesive layer configured to bond the first and second substrates, wherein the adhesive layer has a glass transition temperature between about 100° C. and about 200° C., and wherein a modulus of elasticity of the adhesive layer at 25° C. to 80° C. is 1000 MPa or more.

2. The medium of claim 1, wherein each of the substrates comprises a disk having an outer perimeter with a diameter of about 120 mm, an inner perimeter with a diameter of about 15 mm, and a thickness of about 0.6 mm, and wherein the adhesive layer has an adhesion strength property such that a load value just before separation of the first and second substrates is 4N or more when a rigid thin film metal piece is inserted in a gap between the substrates at a point along the inner perimeter thereof, and the load is applied to the first substrate while fixing the second substrate.

3. The medium of claim 2, wherein each of the substrates includes a reflective layer characterized by a nano indentation hardness property of 60 mgf/μm$^2$.

4. The medium of claim 2, wherein the recording layer comprises a dye having a dissolving property such that after a 2.5 cm polycarbonate square substrate coated with the dye is soaked in 5 ml of water at 75° C. for 60 min, its optical absorption changes by 0.2 or less at the maximum absorption wavelength.

5. The medium of claim 1, wherein each of the substrates includes a reflective layer characterized by a nano indentation hardness property of 60 mgf/μm$^2$.

6. The medium of claim 1, wherein the recording layer comprises a dye having a dissolving property such that after a 2.5 cm polycarbonate square substrate coated with the dye is soaked in 5 ml of water at 75° C. for 60 min, its optical absorption changes by 0.2 or less at the maximum absorption wavelength.

* * * * *